United States Patent
Chen et al.

(10) Patent No.: US 10,390,009 B1
(45) Date of Patent: Aug. 20, 2019

(54) SYSTEM, METHOD, AND COMPUTER-READABLE MEDIUM FOR ADAPTIVE DISPLAY CALIBRATION AND PROFILING

(71) Applicant: AVAGO TECHNOLOGIES INTERNATIONAL SALES PTE. LIMITED

(72) Inventors: Peisong Chen, San Diego, CA (US); Richard Hayden Wyman, Sunnyvale, CA (US); Gheorghe Berbecel, Irvine, CA (US); Frederick George Walls, Grafton, WI (US); David C. Wu, San Diego, CA (US); Wade Keith Wan, Villa Park, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/962,622

(22) Filed: Apr. 25, 2018

(51) Int. Cl.
*H04N 9/73* (2006.01)
*H04N 17/04* (2006.01)
*G09G 3/00* (2006.01)
*G09G 5/00* (2006.01)

(52) U.S. Cl.
CPC .............. *H04N 17/04* (2013.01); *G09G 3/006* (2013.01); *G09G 5/005* (2013.01); *H04N 9/73* (2013.01); *G09G 2320/0693* (2013.01); *G09G 2340/06* (2013.01); *G09G 2360/144* (2013.01); *G09G 2360/145* (2013.01)

(58) Field of Classification Search
CPC .......... H04N 17/04; H04N 9/73; G09G 3/006; G09G 5/005; G09G 2320/0693; G09G 2340/06; G09G 2360/144; G09G 2360/145
USPC ......................................... 348/180
See application file for complete search history.

(56) References Cited

U.S. PATENT DOCUMENTS

| 8,561,122 B2 * | 10/2013 | Kirk ..................... H04N 17/045 348/181 |
| 2017/0134723 A1 * | 5/2017 | Mandel ................ H04N 17/004 |
| 2018/0033361 A1 * | 2/2018 | Cichonski ............ G09G 3/2003 |

* cited by examiner

*Primary Examiner* — Michael Lee
(74) *Attorney, Agent, or Firm* — Xsensus LLP

(57) ABSTRACT

An adaptive display calibration system includes a display, a photodetector configured to capture light emitted by the display, and a set-top box connected to the display and the photodetector. The set-top box includes processing circuitry configured to transmit one or more test patterns to the display, and receive one or more measurements of the display from the photodetector in response to the test patterns. Additionally, the processing circuitry of the set-top box determines a capability of the display based on the measurements received from the photodetector and programs the set-top box based on the capability of the display.

14 Claims, 3 Drawing Sheets

SYSTEM, METHOD, AND COMPUTER-READABLE MEDIUM FOR ADAPTIVE DISPLAY CALIBRATION AND PROFILING

FIELD OF THE DISCLOSURE

The present disclosure relates to systems and associated methodology for digital image/video processing including adaptive display calibration and profiling for wide color gamut, standard dynamic range and/or high dynamic range video presentation.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Display technologies keep evolving in multiple directions. Video resolution has increased to as high as 8K (8192×4096) and beyond. This means the viewers will have the opportunity to see more detail. Additionally, images/video can provide more vivid colors based on a wide color gamut (e.g., Recommendation ITU-R BT. 2020). Further to improving color quality, the brightness and dynamic range of each pixel is also increasing. As a result, presenting the image/video viewing experience to viewers is becoming more challenging.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to aspects of the disclosed subject matter, an adaptive display calibration system includes a display, a photodetector that receives light emitted by the display, and a set-top box connected to the display and the photodetector. The set-top box includes processing circuitry configured to transmit one or more test patterns to the display, and receive one or more measurements of the display from the photodetector in response to the test patterns. Additionally, the processing circuitry of the set-top box determines a capability of the display based on the measurements received from the photodetector and programs the set-top box based on the capability of the display.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one implementation" or "an implementation" means that a particular feature, structure, characteristic, operation, or function described in connection with an implementation is included in at least one implementation of the disclosed subject matter. Thus, any appearance of the phrases "in one implementation" or "in an implementation" in the specification is not necessarily referring to the same implementation. Further, the particular features, structures, characteristics, operations, or functions may be combined in any suitable manner in one or more implementations. Further, it is intended that implementations of the disclosed subject matter can and do cover modifications and variations of the described implementations.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more."

Figure 1:
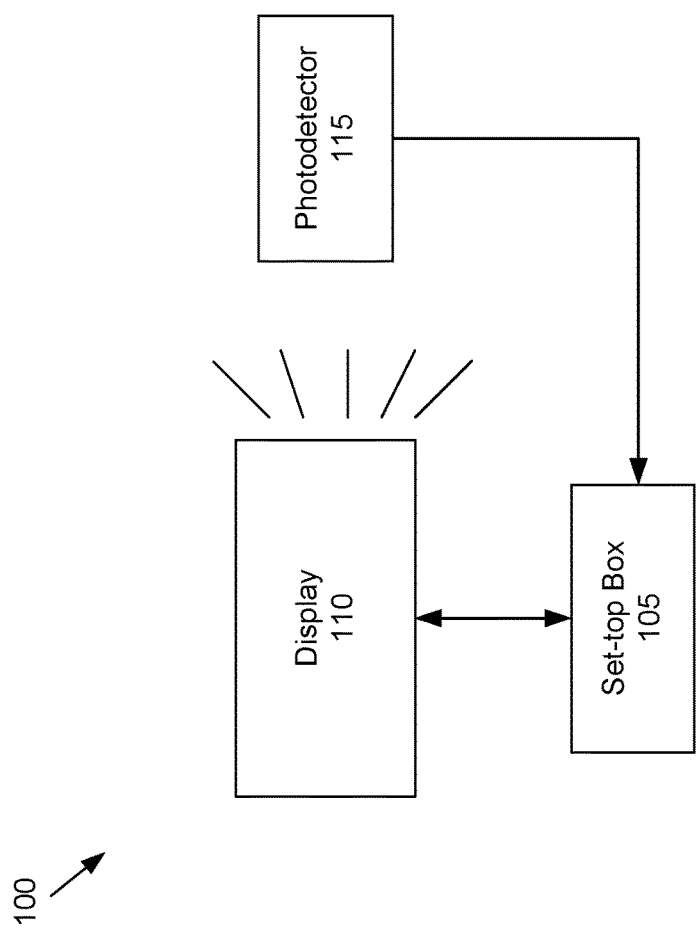
FIG. 1 illustrates an exemplary hardware block diagram of an adaptive display calibration system according to one or more aspects of the disclosed subject matter.

Referring now to the drawings, wherein like reference numerals designate identical or corresponding parts throughout the several views, FIG. 1 illustrates an exemplary hardware block diagram of an adaptive display calibration system 100 according to one or more aspects of the disclosed subject matter. The system 100 can include a set-top box 105 connected to a display 110. The display 110 can transmit light to a photodetector 115, and the photodetector 115 can transmit information back to the set-top box 105 as part of a feedback loop. In one implementation, the display 110 is a television. However, the display 110 can include various types of displays including computer monitors, smart phone displays, navigation displays, projection screens, and the like.

Generally, the system 100 can be configured to calibrate a signal from the set-top box 105 to the display. Calibration can adjust for discrepancies between a standard and actual results. Alternatively, or additionally, the system 100 can be configured for adaptive display profiling of the display 110. In the case of profiling, the set-top box 105 can be configured to measure how the display differs from the standard (due to it being incapable of displaying the entire standard) but does not correct for it. Rather, the signal provided from the set-top box 105 to the display 110 is adjusted in order to best determine ahead of time a signal that will display objectively and/or subjectively well while taking the display's limitations into account. It should be appreciated that the systems and processes described herein can be implemented for both adaptive display calibration and adaptive display profiling.

First, the capability of displays can be considered. For example, wide color gamut and high dynamic range are the technologies to improve viewing experience and help realize an immersive storytelling effect. However, both wide color gamut and high dynamic range are vaguely defined and sometimes different viewers may have different definitions. For example, some viewers may equate a brighter display to a high dynamic range (HDR), while other viewers may think high dynamic range refers to a higher ratio of peak brightness to dark levels. Likewise, even though many display manufacturers claim their televisions support wide color gamut and high dynamic range, the actual capabilities of those televisions may be drastically different.

At the same time, content providers start to roll out content tagged with wide color gamut and high dynamic range. From a content side, there is HDR content and standard dynamic range (SDR) content. From a display side, there are HDR capable displays and SDR capable displays. In order to match a display to input content, there can be a need for color space conversion and/or dynamic range adjustment. Usually the conversion and adjustment can be done either within a display or a separate device such as a set-top box. In one implementation, the processing is performed in the set-top box 105. However, it should be appreciated that the present invention is not limited by the particular examples disclosed herein.

For a set-top box (e.g., set-top box 105) to properly handle color space conversion and dynamic range adjustment, understanding the full capability of its inter-connected display (e.g., display 110) is critical. Even though a display claims it supports a certain standard, that does not mean it can display any given color defined in the standard, and it does not mean it can display any brightness defined in the standard. To fill the information gap between the set-top box 105 and the display, a photodetector (e.g., the photodetector 115) can be used to determine the full capability of the display 110 and convey that information to the set-top box 105, which will use the information from the photodetector 115 to adaptively program the color space conversion and dynamic range adjustment of the set-top box 105.

More specifically, the set-top box 105 can be configured to feed different test patterns to the display 110, for example. The different test patterns can be predetermined images and/or videos. Additionally, the set-top box 105 may receive information from the display 110. For example, the information received from the display 110 can include a manufacturer, a model of the display, capabilities of the display, and the like. The photodetector 115 can be used to measure how much the signal from the set-top box 105 can increase in brightness before the display 110 can no longer reflect it (e.g., because the display 110 is tone mapping due to a power or brightness constraint). As a result, the photodetector 115 can determine the maximum brightness of the display 110. Additionally, the photodetector 115 can also be used to measure a color gamut of the display 110 to determine which colors the display 110 is not capable of displaying. The photodetector 115 can feed the information collected from the display 110 back to the set-top box 105. As a result, the set-top box 105 can determine the full capabilities of the display 110.

In one implementation, the set-top box 105 is connected to the display 110 where the display 110 is an SDR-capable display. Previously, without knowing the full capability of the display, a set-top box might assume the peak brightness of the display is 100 nits. When the input source content from the set-top box is HDR, the set-top box could perform HDR to SDR conversion before feeding the content to the display. Here, the peak brightness is the most important parameter in the conversion. Usually during HDR to SDR conversion, the shadow and mid-tone are preserved as much as possible, while highlights are ramped down to be suitable for display. Therefore, details/information could be lost, especially in highlight areas. However, regarding the system 100, the set-top box 105 can determine the actual peak brightness of the display 110 based on the feedback loop with the photodetector 115. For example, if the actual peak brightness of the display is 300 nits instead of 100 nits, the tone mapping can be adjusted accordingly and details in highlight areas can be better accommodated.

In one implementation, the set-top box 105 can be connected to the display 110 where the display 110 is an HDR-capable display, and the set-top box 105 can feed SDR content to the display 110. As would be known by a person of ordinary skill in the art, the actual peak brightness of an HDR-capable display can vary. Therefore, when a set-top box does SDR to HDR conversion, the actual peak brightness may not be known. For example, the set-top box may conservatively assume it is 500 nits, but if the display can reach 1000 nits, the set-top box will not be utilizing the display's full potential. However, regarding the system 100, the set-top box 105 can determine the actual peak brightness of the display 110 based on the feedback loop with the photodetector 115. For example, if the actual peak brightness of the display is 1000 nits instead of 500 nits, the set-top box 105 can be configured to display the content on the display 110 accordingly.

The photodetector 115 may represent one or more photodetectors in the system 100. The photodetector 115 can be various devices configured to sense light including a smart phone, tablet, camera, video camera, and the like. The photodetector 115 can be configured to collect various information from the display 110. For example, the photodetector 115 can be used to find the color gamut boundary of the display 110, and the information can be utilized by the set-top box 105 to handle color space conversion (e.g., from BT. 2020 to BT. 709). Additionally, the photodetector 115 can measure ambient light in the environment of the display 110. For example, the set-top box 105 can receive, from the photodetector 115, the ambient light information. The set-top box 105 can also query the display 110 for capability information. As a result, the set-top box 105 can perform an improved color space conversion and/or dynamic range adjustment using both the measurements from the photodetector 115 and the capability information.

One advantage of the calibration and/or profiling process is that the viewing conditions are automatically taken into consideration. In one implementation, the set-top box 105 can include the photodetector 115 embedded in the set-top box 105 to help measure the overall lighting of the environment of the display 110 (e.g., the room that the television is in).

When the photodetector 115 is a camera, smart phone, or any Wi-Fi and/or Bluetooth enable device, the photodetector 115 can be connected to the set-top box 105 through Wi-Fi, Bluetooth, or any other wired/wireless networks. In one implementation, a software application stored on one or more of the photodetector 115 and the set-top box 105 can coordinate the calibration and/or profiling process using a graphical user interface (GUI) and guided instructions, for example.

Regarding the test patterns, the set-top box 105 and/or the display 110 can output specific test patterns. Additionally, the set-top box 105 and/or the display 110 can provide instructions (e.g., displayed on the display 110, included in instructions displayed via the photodetector 115, etc.) indicating that a viewer should set lighting conditions a predetermined way and stand a certain distance away. Correct execution of these instructions can be confirmed by the photodetector 115, for example, by displaying a confirmation message, playing a predetermined sound and/or message, displaying a predetermined color, and the like. The photodetector 115 can then be used to collect raw sensor data about the display characteristics of the display 110. In one implementation, the predetermined test pattern is dynamic (i.e., a video) to assess how peak brightness changes as a function of the average brightness of the video. Further, the process can be iterative such that test patterns used can be changed depending on results from earlier test patterns.

Additionally, the viewer can also be involved in the calibration and/or profiling process based on viewer preferences. For example, the set-top box 105 can send images to the display 110. The viewer can then select their preference (e.g., select peak brightness) as some viewers may prefer watching a television that is not as bright even though the display 110 is capable of higher peak brightness. In one implementation, additional information for the calibration process can be obtained by displaying two options and asking the viewer to pick the one they prefer or the one that best fits the instructions given on screen (or audibly). Based on the answer given, more choices can be presented to hone in on a calibrated display. Alternatively, or in addition, the viewer could be presented with a slider and asked to adjust it to their desired (or instructed) position. This additional information can be combined with the photodetector measurements (or instead of the photodetector measurements).

In one implementation, the set-top box 105 and/or the display 110 are connected to the Internet such that the set-top box 105 and/or the display 110 is configured to share calibration information and/or corresponding display information with other set-top boxes and displays connected via a cloud database. For example, calibration parameters and corresponding display information can be uploaded to the cloud database from the set-top box 105 and/or the display 110. Accordingly, if there is information about the make and/or model of the display that can be queried, that information can be uploaded to the cloud in addition to the calibration information. Additionally, service providers who may perform more sophisticated measurements can also provide their measurements and recommended settings to the cloud database.

The adaptive display calibration can occur during a set-up phase. For example, the adaptive display calibration can occur when a viewer is installing a new television and/or a new set-top box. Alternatively, or additionally, the adaptive display calibration can occur continuously and/or periodically to account for particular situations (e.g., less light in the winter, watching television in the evening with less ambient light, etc.).

Accordingly, the system 100 includes several advantages including determining an actual capability of the display 110. Based on the feedback loop where the set-top box 105 feeds predetermined test patterns to the display 110, the photodetector 115 collects information displayed by the display 110, and the photodetector feeds the collected information back to the set-top box 105, the set-top box 105 can determine the actual capability of the display 110.

Figure 2:
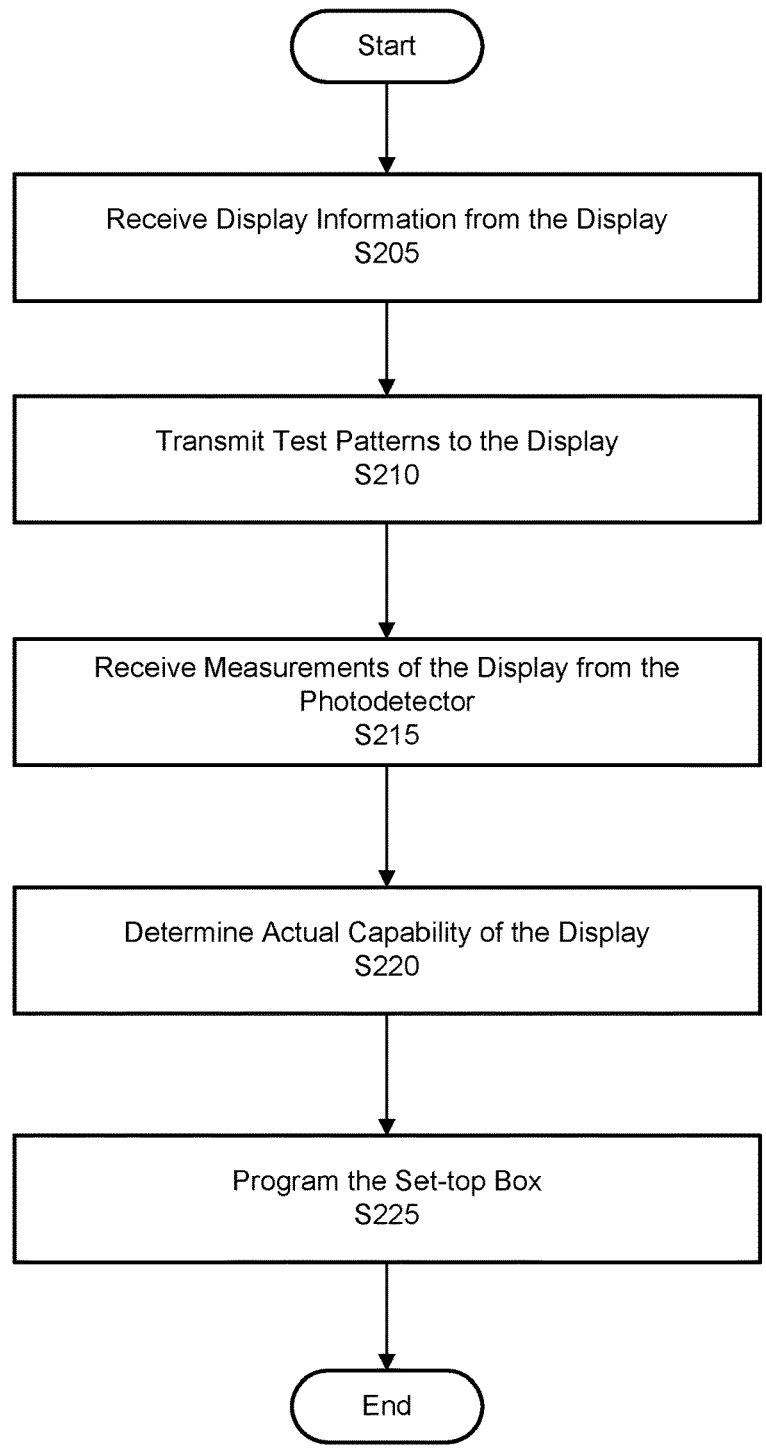
FIG. 2 is an exemplary algorithmic flow chart of a method for adaptive display calibration according to one or more aspects of the disclosed subject matter.

FIG. 2 is an exemplary algorithmic flow chart of a method for adaptive display calibration according to one or more aspects of the disclosed subject matter.

In S205, the set-top box 105 can receive display information from the display 110. The display information can include a manufacturer of the display, a display model, display capabilities, and the like. For example, the extended display identification data (EDID) from the display (e.g., a television) may include what formats/colors it advertises that the television supports.

In S210, the set-top box 105 can transmit one or more predetermined test patterns to the display 110 based on the received display information. The predetermined test patterns can be images and/or videos configured to provide the photodetector 115 with information about the capabilities of the display 110.

In S215, the set-top box 105 can receive measurements of the display 110 from the photodetector 115. The photodetector 115 can measure the display 110 in response to the test patterns. The measurements of the display 110 can include one or more capabilities of the display 110. For example, the measurements can include a maximum brightness of the display 110. Additionally, the measurements can include a color gamut of the display 110.

In S220, the set-top box 105 can determine an actual capability of the display 110 based on the measurements received from the photodetector 115. For example, the measurements received from the photodetector 115 may indicate that the display is capable of a max brightness of 1000 nits compared to a default estimate of 500 nits. It should be appreciated that brightness may be a function of the screen area of the display 110. For example, if the display 110 displays a white square that is only 1% of the screen area, the white square that is only 1% of the screen area may achieve a greater peak brightness than if 100% of the screen is white. Accordingly, brightness may be determined by a brightness function that takes one or more of the following parameters: a percentage of the pixels on screen that are greater than a predetermined brightness threshold, an average picture level, an average max Red, Blue, Green (R, G, B), average luminance, and the like.

In S225, the set-top box 105 can be programmed 110 based on the actual capability of the display 110 determined in S220.

In the above description of FIG. 2, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be repeated or executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 3:
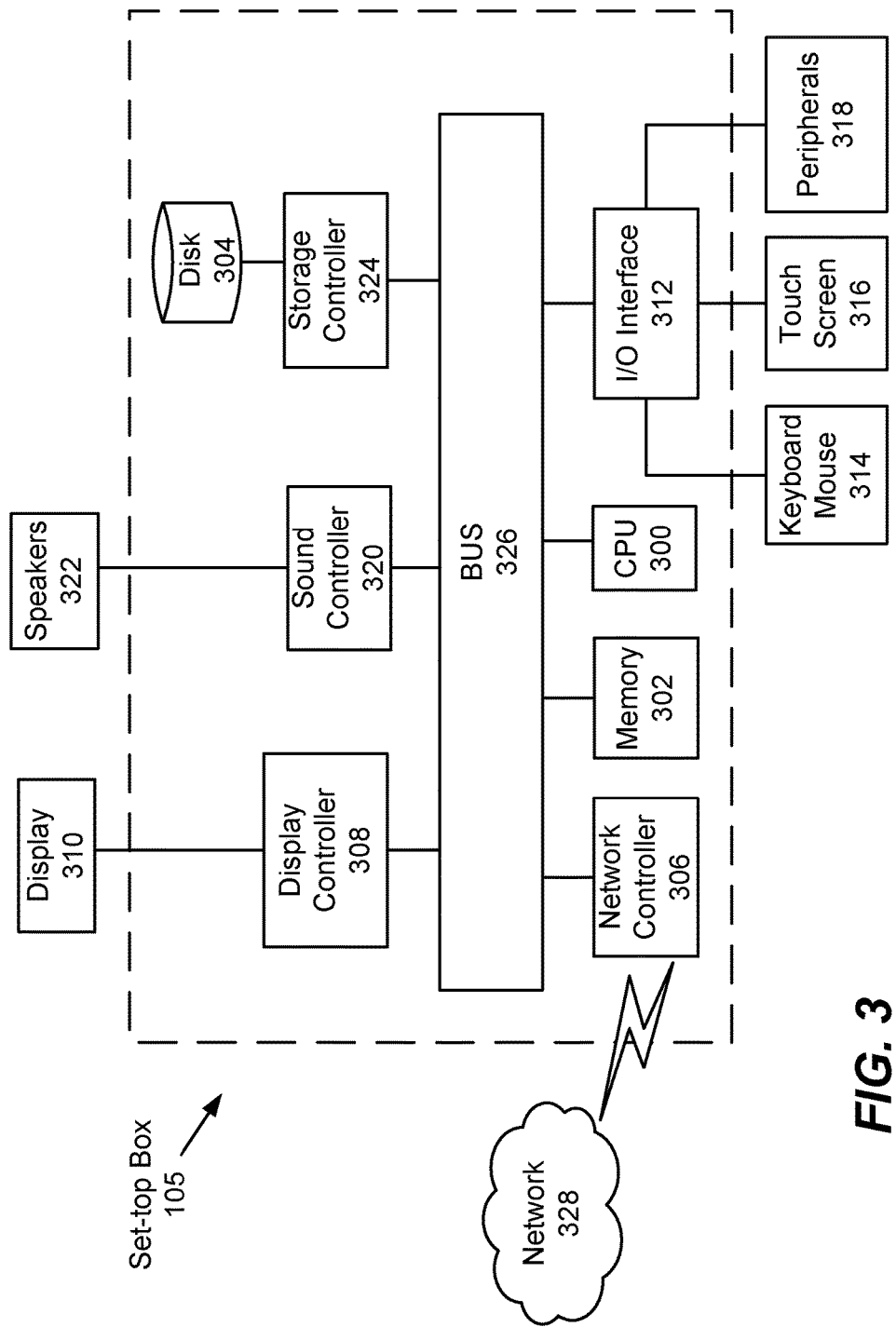
FIG. 3 is a hardware block diagram of a set-top box according to one or more exemplary aspects of the disclosed subject matter.

Next, a hardware description of a computer/device (such as the set-top box 105) according to exemplary embodiments is described with reference to FIG. 3. The hardware description described herein can also be a hardware description of the processing circuitry. In FIG. 3, the set-top box 105 includes a CPU 300 which performs one or more of the processes described above/below. The process data and instructions may be stored in memory 302. These processes and instructions may also be stored on a storage medium disk 304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the set-top box 105 communicates, such as a server or computer.

Further, the claimed advancements may be provided as a utility application, background daemon, or component of an operating system, or combination thereof, executing in conjunction with CPU 300 and an operating system such as Microsoft Windows, UNIX, Solaris, LINUX, Apple MAC-OS and other systems known to those skilled in the art.

The hardware elements in order to achieve the set-top box 105 may be realized by various circuitry elements. Further, each of the functions of the above described embodiments may be implemented by circuitry, which includes one or more processing circuits. A processing circuit includes a particularly programmed processor, for example, processor (CPU) 300, as shown in FIG. 3. A processing circuit also includes devices such as an application specific integrated circuit (ASIC) and conventional circuit components arranged to perform the recited functions.

In FIG. 3, the set-top box 105 includes a CPU 300 which performs the processes described above. The set-top box 105 may be a general-purpose computer or a particular, special-purpose machine. In one embodiment, the set-top box 105 becomes a particular, special-purpose machine when the processor 300 is programmed to perform adaptive display calibration (and in particular, any of the processes discussed with reference to FIG. 2).

Alternatively, or additionally, the CPU 300 may be implemented on an FPGA, ASIC, PLD or using discrete logic circuits, as one of ordinary skill in the art would recognize. Further, CPU 300 may be implemented as multiple processors cooperatively working in parallel to perform the instructions of the inventive processes described above.

The set-top box 105 in FIG. 3 also includes a network controller 306, such as an Intel Ethernet PRO network interface card from Intel Corporation of America, for interfacing with network 328. As can be appreciated, the network 328 can be a public network, such as the Internet, or a private network such as an LAN or WAN network, or any combination thereof and can also include PSTN or ISDN sub-networks. The network 328 can also be wired, such as an Ethernet network, or can be wireless such as a cellular network including EDGE, 3G and 4G wireless cellular systems. The wireless network can also be WiFi, Bluetooth, or any other wireless form of communication that is known.

The set-top box 105 further includes a display controller 308, such as a graphics card or graphics adaptor for interfacing with display 310, such as a monitor. A general purpose I/O interface 312 interfaces with a keyboard and/or mouse 314 as well as a touch screen panel 316 on or separate from display 310. General purpose I/O interface also connects to a variety of peripherals 318 including printers and scanners.

A sound controller 320 is also provided in the set-top box 105 to interface with speakers/microphone 322 thereby providing sounds and/or music.

The general purpose storage controller 324 connects the storage medium disk 304 with communication bus 326, which may be an ISA, EISA, VESA, PCI, or similar, for interconnecting all of the components of the set-top box 105. A description of the general features and functionality of the display 310, keyboard and/or mouse 314, as well as the display controller 308, storage controller 324, network controller 306, sound controller 320, and general purpose I/O interface 312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A system, comprising:
   a display;
   a photodetector; and
   a set-top box connected to the display and the photodetector, the set-top box including processing circuitry configured to
     transmit one or more test patterns to the display,
     receive display information regarding how the display displays the test patterns,
     determine a capability of the display based on the display information,
     program the set-top box based on the capability of the display,
     receive ambient light measurements corresponding to an environment of the display from the photodetector, and perform color space conversion, wherein the color space conversion is performed based on a combination of the ambient light measurement and one or more measurements of the display.

2. The system of claim 1, wherein the processing circuitry is further configured to receive additional display information from the display.

3. The system of claim 2, wherein the additional display information includes a display manufacturer, a display model, and display capabilities.

4. The system of claim 1, wherein the display information is received via user input in response to user prompts.

5. The system of claim 1, wherein the display information is received from the photodetector which is configured to capture light from the display.

6. A method for adaptive display calibration, comprising:
transmitting, via processing circuitry, one or more test patterns to a display;
receiving, via the processing circuitry, display information regarding how the display displays the test patterns;
determining, via the processing circuitry, a capability of the display based on the display information;
program, via the processing circuitry, a set-top box based on the capability of the display;
receiving, via the processing circuitry, ambient light measurements corresponding to an environment of the display from a photodetector; and
performing color space conversion, wherein the color space conversion is performed based on a combination of the ambient light measurement and one or more measurements of the display.

7. The method of claim 6, further comprising:
receiving additional display information from the display.

8. The method of claim 7, wherein the additional display information includes a display manufacturer, a display model, and display capabilities.

9. The method of claim 6, wherein the display information is received via user input in response to user prompts.

10. The method of claim 6, wherein the display information is received from the photodetector which is configured to capture light from the display.

11. A non-transitory computer-readable storage medium storing computer-readable instructions thereon which, when executed by a computer, cause the computer to perform a method, the method comprising:
transmitting one or more test patterns to a display;
receiving display information regarding how the display displays the test patterns;
determining a capability of the display based on the display information;
program a set-top box based on the capability of the display;
receiving ambient light measurements corresponding to an environment of the display from a photodetector; and
performing color space conversion, wherein the color space conversion is performed based on a combination of the ambient light measurement and one or more measurements of the display.

12. The non-transitory computer-readable storage medium of claim 11, further comprising:
receiving additional display information from the display.

13. The non-transitory computer-readable storage medium of claim 11, wherein the display information is received via user input in response to user prompts.

14. The non-transitory computer-readable storage medium of claim 11, wherein the display information is received from the photodetector which is configured to capture light from the display.

* * * * *